United States Patent [19]
Tanaka et al.

[11] Patent Number: 5,116,760
[45] Date of Patent: May 26, 1992

[54] APPARATUS FOR MANUFACTURE OF ORGANIC FERTILIZERS

[75] Inventors: Toshikazu Tanaka, Okayama; Yoshinori Fujii, 1-7-11, Midorimachi, Chikko, Okayama-shi, Okayama, both of Japan

[73] Assignees: Hagihara Industries, Inc.; Yoshinori Fujii, both of Japan

[21] Appl. No.: 557,250

[22] Filed: Jun. 24, 1990

[30] Foreign Application Priority Data

Jul. 26, 1989 [JP] Japan ................................. 1-194825

[51] Int. Cl.⁵ ............................................. C05F 15/00
[52] U.S. Cl. ....................................... 435/290; 71/11; 435/287; 435/313
[58] Field of Search ........................... 422/184; 71/11; 435/287, 313, 290

[56] References Cited

U.S. PATENT DOCUMENTS

| | | | |
|---|---|---|---|
| 4,062,770 | 12/1977 | Kneer | 422/184 |
| 4,384,878 | 5/1983 | Nordlund et al. | 422/184 |
| 4,521,517 | 6/1985 | Gauthier | 422/184 |
| 4,798,802 | 1/1989 | Ryan | 422/184 |

FOREIGN PATENT DOCUMENTS

| | | |
|---|---|---|
| 55-29958 | 8/1980 | Japan . |
| 55-32680 | 8/1980 | Japan . |
| 63-201082 | 8/1988 | Japan . |

Primary Examiner—Timothy M. McMahon
Attorney, Agent, or Firm—Jordan and Hamburg

[57] ABSTRACT

In a method and an apparatus for aerobic fermentation of biodegradable refuse to produce an odorless organic fertilizer, the apparatus includes an air blower and an air sucker each comprising a plurality of horizontal cross air pipes and pendant air line members arranged in horizontally spaced relation in a fermentation vessel. The two blowers are functionally reversible and connected to each other through a heat exchanger. Each of the blowers is provided with an automatic air flow/temperature control unit for automatic operation. The method and apparatus assure ease of discharge of the product of fermentation, increased efficiency of fermentation and conservation of time, labor and energy.

6 Claims, 6 Drawing Sheets

APPARATUS FOR MANUFACTURE OF ORGANIC FERTILIZERS

BACKGROUND OF THE INVENTION

1. Field of the Invention

The present invention relates to a method for fermentation of a biodegradable or fermentable refuse slurry comprising causing household refuse, organic industrial waste, animal manure or the like to ferment into an odorless fertilizer and an apparatus for manufacture of an organic fertilizer from such refuse.

2. Brief Description of the Prior Art

The technique of aerobic fermentation of a biodegradable refuse slurry to produce an odorless fertilizer has been implemented using various systems. For example, Japanese Patent Publication No. 55-29958 discloses a fluidized-bed technique which comprises charging a horizontal rotary cylinder in a vertically splittable casing with a fermentable refuse slurry whose water content has been adjusted with saw dust and introducing warm air into the cylinder to cause fermentation. Japanese Patent Publication No. 55-32680 discloses a fixed-bed technique comprising feeding a fermentable refuse slurry into a stationary wire-mesh vessel disposed in a casing and having a plurality of wire-mesh cylinders extending vertically from the bottom thereof and feeding air from the bottoms of said cylinders upwardly to cause fermentation.

Regarding the latter fixed-bed technique, one of the inventors of the present invention previously proposed an improvement in Japanese Kokai Patent Publication No. 63-201082, which offers an increased efficiency of aerobic fermentation and a facilitated withdrawal of the fermentation product.

In this improved system, the starting material to be fermented is fed from the top of the vessel via a conveyer or the like and, after fermentation, the bottom plate of the vessel is swung open downwardly to effect withdrawal of the product of fermentation en bloc. The fermentation vessel is internally provided with a plurality of air supply pipes each having a multiplicity of air outlets and each of these air supply pipes is rigidly secured to a plate extending from the inner wall of the vessel at 2 or 3 levels by means of saddle bands or the like. The lower end of the pipe communicates with a corresponding hole drilled in the bottom plate so that feed air (warm air) may be blown into the pipe through said hole. Thus, the bottom of the vessel is comprised of two bottom plates and as the warm air is supplied to the enclosed space between the two bottom plates, it is fed into the interior of the vessel through said holes in the upper bottom plate and said air supply pipes. The spent air is exhausted from exhaust holes in the upper lid. As the charged slurry is fermented, the internal temperature of the vessel is increased and heavily moisture-laden warm air is exhausted.

While the above equipment accomplished its objects fairly well, the following problems remained to be solved yet.

(1) In withdrawing the fermentation product from the fixed-bed equipment, the fermentation product compacted and bridging the plural air supply pipes does not fall smoothly even when the bottom plate of the vessel is open wide and it is necessary for the operator to wait for some time until the gravity discharge has been completed or push the product down with a rod or the like from the top opening. Thus, it takes much labor and time to withdraw the fermentation product.

(2) Polyvinyl chloride pipe is generally used for the air supply pipes from the consideration of corrosion resistance and equipment cost but since the lower end of each air supply pipe is supported in alignment with the hole in the bottom plate, the pipe tends to be bent on charging the vessel with the material to be fermented or deformed by heat so that the alignment between the lower end of the pipe and the hole in the bottom plate is sometimes disturbed so as to prevent the proper air supply.

(3) Because the air supply pipes are used exclusively for supplying air, there is substantially no air flow in the direction from one pipe to another, with the air being fed only to the vicinity of each pipe. Moreover, because the upper part of the fermentation vessel is supplied with a comparatively larger amount of air than is the lower part, no uniform supply of air could be insured throughout the whole fixed bed.

Furthemore, just because of the structural characteristic of the equipment that the warm air is not directly fed to the air supply pipes within the vessel but is first fed to the space between the upper and lower bottom plates and, then, supplied to the respective air supply pipes, the loss of heat is fairly large and the cost of operation is as much increased.

(4) Though it depends on the fermentation load to be dealt with, generally a plant is made up of 3 or more fermentation vessels. Then, each fermentation vessel differs from the other vessels in the status of fermentation, so that the internal temperature also varies from one vessel to another.

For a fermentation vessel where a low temperature prevails, warm air must be supplied to expedite the fermentation reaction, while no warm air is needed in the vessel where a high temperature prevails. Moreover, although the temperature of exhaust air from the latter vessel is also high, the exhaust air is directly exhausted without reclaiming its heat, while the feed air is constantly heated.

(5) In the above fermentation system, fermentor temperature control and supply/exhaust air flow control depend much on experience and require frequent check of the fermentation process, for example by reference to readings of temperature sensors installed with the vessel.

OBJECT OF THE INVENTION

It is an object of the present invention to provide an improved method for fermenting a biodegradable refuse slurry for the production of an odorless fertilizer.

It is another object of the invention to provide an automatic plant for the manufacture of an organic fertilizer from a biodegradable refuse slurry.

SUMMARY OF THE INVENTION

The present invention relates to a method for fermenting an organic biodegradable refuse which comprises fermenting aerobically a moistureconditioned organic biodegradable refuse which comprises blowing and withdrawing air through and from a pile of said refuse through orifices provided in each of a plurality of air blow means and air suction means which are alternately and vertically arranged in horizontally spaced-apart relation in a confined spaced accommodating said pile of refuse. Preferably, the method comprises fermenting aerobically said organic biodegradable refuse while said air blow means and air suction means are maintained in heat-exchangeable relation and said blow means and air suction means being mutually reversed in function according to a program and said blow means and air suction means are provided with an automatic air flow/temperature contro unit for automatic operation.

The invention is further directed to an apparatus for manufacture of an organic fertilizer from an organic biodegradable refuse which comprises at least one fermentor having a top cover which is opened and closed, a heat-insulated body and a bottom cover which is opened and closed, an air blow frame pipe and an air suction frame pipe which are horizontally arranged and forming part of a top frame structure of said body, and a plurality of air blow means and air suction means pendant from said part of the top frame structure and communicating with either one of said air blow frame pipe and air suction frame pipe, each of said air blow means and each of said air suction means being disposed in parallel, horizontally spaced apart and alternate relation.

As an embodiment, each of said air blow means comprises a plurality of air blow cross pipes and a perforated blow tube pendant from and communicating with each of said cross pipes and said suction means comprises a plurality of air suction cross pipes and a perforated suction tube pendant from and communicating with each of said cross pipes, said air blow and suction means being alternately arranged.

In another embodiment, said air blow means comprises a plurality of air blow cross pipes and a sealed hollow member consisting of two perforated plates as pendant from and communicating with each of said cross pipes and said air suction means comprises a plurality of air suction cross pipes and a sealed hollow member consisting of two perforated plates as pendant from and communicating with each of said cross pipes, said air blow and suction means being alternately arranged.

In a further embodiment, said air blow means and air suction means are functionally reversible in such manner that the former may function as air suction means and the latter may function as air blow means and each of said air blow and suction means is provided with an automatic flow/temperature control unit and a heat exchanger.

DETAILED DESCRIPTION OF THE PREFERRED EMBODIMENT

Figure 1:
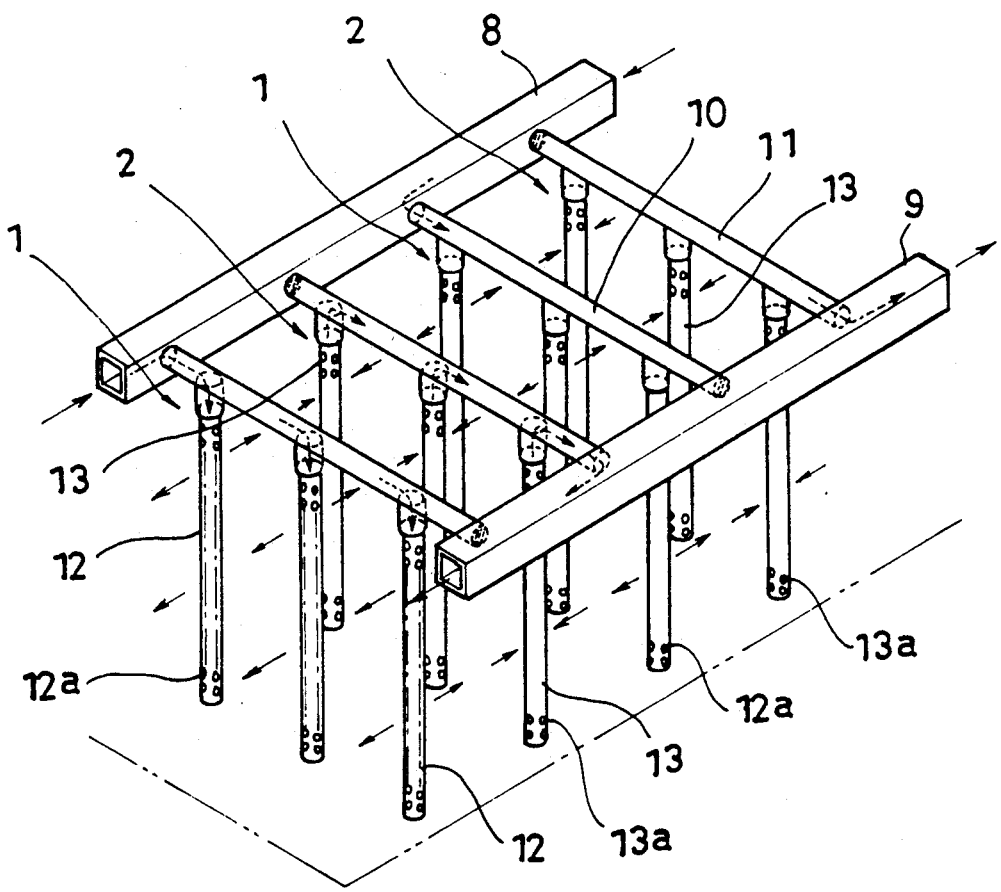
FIG. 1 is a perspective schematic view showing the arrangement of a first and a second air line means.

The arrangement of the air line system is first described in detail. As shown in FIG. 1, which illustrates a fermentation vessel embodying the principles of the invention, a top opening 7 constituting a charging port of the fermentation vessel is divided into two sections and an air blow frame pipe 8 and an air suction frame pipe 9, each made of rectangular-sectioned steel pipe, are formed in juxtaposition along one of the sections. Connected to the air blow frame pipe 8 and air suction frame pipe are 9 an air blow means and an air suction means, respectively. Spanning these frame pipes are air blow cross pipes 10 and air suction cross pipes 11. The air blow cross pipes 10 communicate with the air blow frame pipe 8 but do not communicate with the air suction frame pipes 9. Conversely, the air suction cross lines 11 communicate with the air suction frame pipe 9 and do not communicate with the air blow frame pipe 8. In this manner, the air blow cross lines for supply of air and the air suction cross lines for withdrawal of air are arranged alternately and bridging the two frame pipes. Pendant from each of the cross lines 10, 11 are several perforated tubes made of a corrosion-resistant material such as stainless steel, so as to provide vertical blow tubes 12 and suction tubes 13 which constitute air blow means 1 and air suction means 2, respectively. The bottom of each of these vertical blow tubes 12 and suction tubes 13 is closed by a blind cover of rubber or plastic material or otherwise sealed and engaged in intimate sealing relation with a bottom plate. Each of the blow tubes 12 is provided with a multiplicity of air blow orifices 12a throughout its peripheral wall and each of the suction tubes 13 is provided with a multiplicity of air suction orifices 13a throughout its peripheral wall.

In the above arrangement, the feed air flows through the air suction frame pipe 8 to the vertical blow tubes 12 through the blow cross pipes 10 and is blown out from the air blow orifices 12a of the blow tubes 12. Part of the air thus blown out ascends, while the other is sucked into the air suction orifices 13a of the vertical suction tubes 13, then reaches the suction cross pipe 11 and is finally exhausted from the air suction frame pipe 9.

The above air supply means and air exhaust means air periodically switched from one to the other as will be described hereinafter to reverse the routes of air supply and exhaust.

Figure 2:
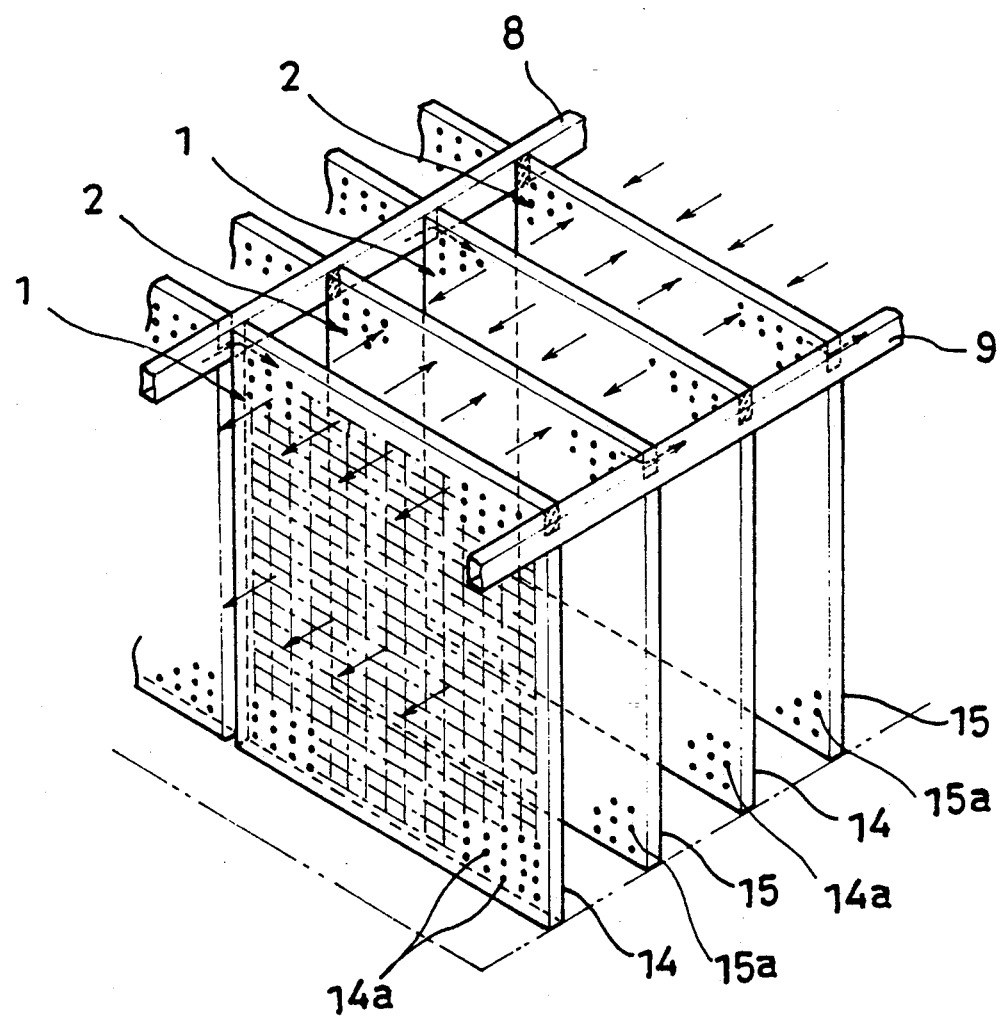
FIG. 2 is a perspective schematic view showing a modification thereof.

FIG. 2 is another example of the air blow and air suction arrangement, wherein plate-shaped pendant blow plate means 14 and suction plate means 15 are used in lieu of the vertical blow tubes 12 and suction tubes 13 shown in FIG. 1. As shown, this plate-like pendant blow plate member 14 and suction plate member 15 are constituted each by disposing two perforated plates having a multiplicity of orifices 14a or 15a and connecting them at lateral edges with a clearance provided between any two adjacent plates. These pendant blow plate means 14 and suction plate means 15 communicate with the air blow frame pipe 8 and air suction frame pipe 9, respectively. The air blow means 1 constituted by these air blow plate means 14 and the air suction means 2 constituted by the air suction plate means 15 are alternately arranged with suitable horizontal spacings just as in the case of the vertical tubes described with reference to FIG. 1. Otherwise, the construction of this example is similar to that of the example illustrated in FIG. 1.

In this example, too, the air supplied from the air blow frame pipe 8 is blown out from the orifices 14a of the pendant blow plate means 14 and while part of the air thus blown out ascends, the other part is sucked into the multiplicity of orifices 15a formed in the pendant suction plate means 15 and is exhausted from the air suction frame pipe 9.

Figure 3:
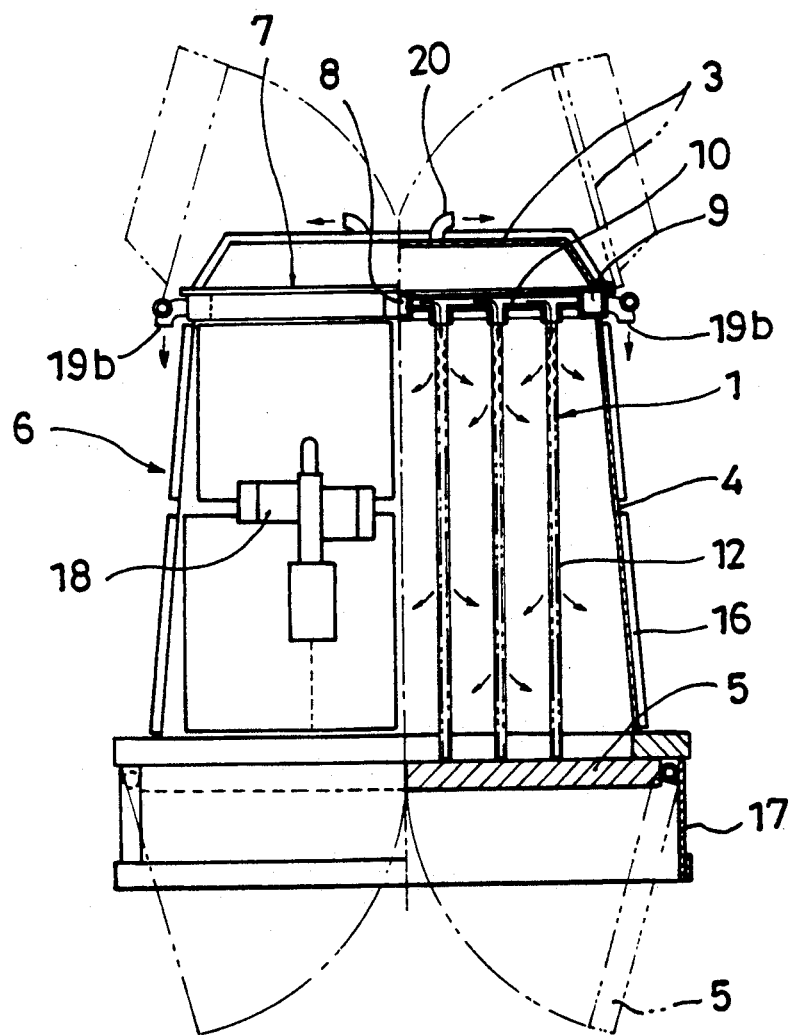
FIG. 3 is a partially exploded front view showing a fermentation vessel.
Figure 4:
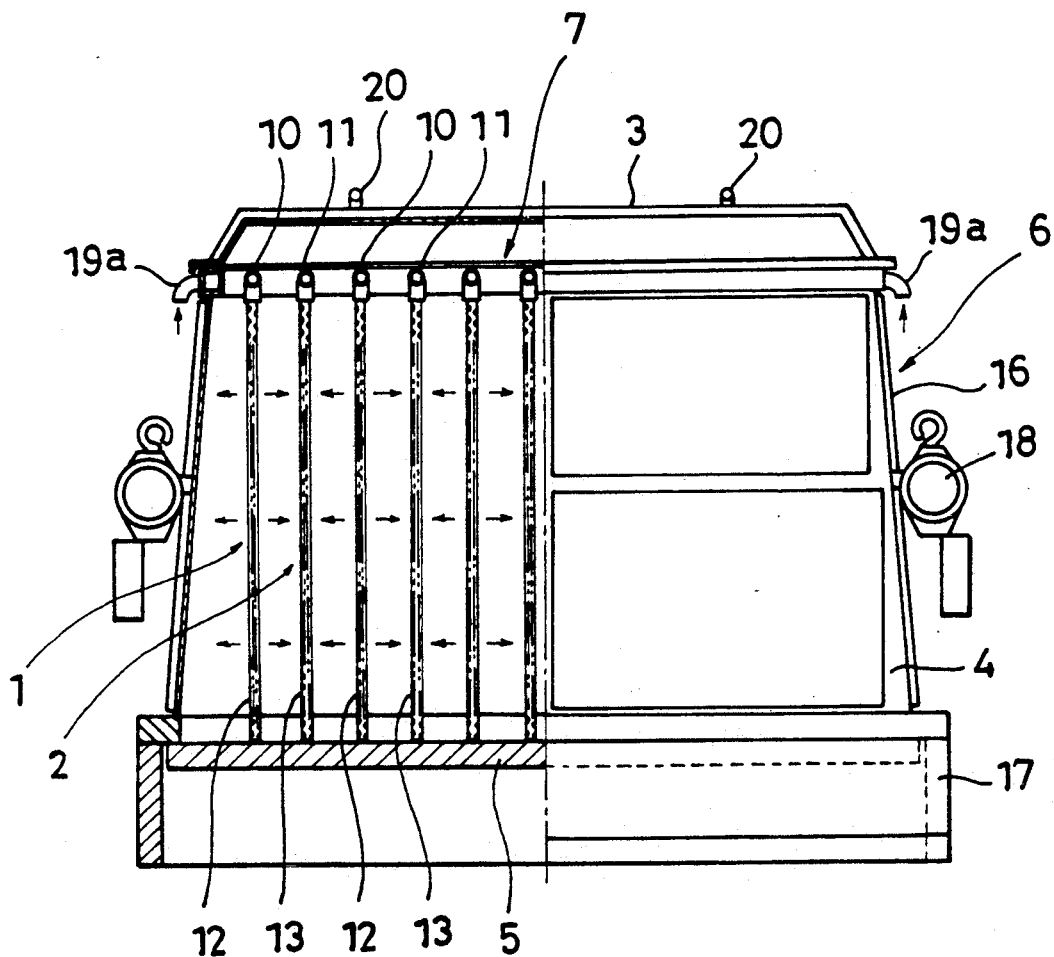
FIG. 4 is a partially exploded side-elevation view of the same.

FIGS. 3 and 4 show a specific embodiment of the fermentation tank having the structure illustrated in FIG. 1. An insulated vessel 4 constituting the fermentation tank is externally lined with a heat-insulating material 16 and is mounted on a base 17. The base is provided with a discharge bottom plate 5 which can be opened and closed by a motor block 18. The top charging frame structure 7 is made of steel pipe of rectangular section and partly blinded to provide said air blow frame pipe 8 and suction frame pipe 9. As mentioned above, these pipes 8 and 9 are bridged by blow cross pipes 10 and suction cross pipes 11, from which blow tubes 12 and suction tubes 13 extend vertically downward. The top frame structure 7 is provided with air supply-exhaust ports 19a, 19b and the air is fed or exhausted through a hose connected to each of them. The top frame structure 7 is provided with a top cover 3, which is of the cantilever type in this embodiment. This top cover 3 is provided with an exhaust port 20 for exhaust of air.

In the fermentation using the above apparatus, the charge consisting in a moisture-conditioned fermentable refuse slurry is chuted into the fermentation tank 6 via a conveyor or the like. After charging, the top cover 3 is closed and initial warm air is introduced from the air blow frame pipe 8. The introduced air flows through the blow cross pipes 10 and is blown out from the multiplicity of orifices 12a formed in the pendant blow tubes 12. The air thus blown out passes through a fixed-bed of the charge and a portion thereof flows in a horizontal direction and is sucked into the orifices 13a of the vertical suction tubes 13, while the remainder of air ascends and is exhausted through the exhaust port 20. The above air supply and exhaust functions of the piping system are switched periodically from one to the other, with the result that the air is uniformly and efficiently distributed into the charge in the fermentation tank to insure invigorated fermentation and completion of fermentation within a short time period. With the progress of fermentation, the temperature of the charge increases and accordingly the transfer of air is enhanced. After completion of fermentation, the bottom plate 5 opens and the product fertilizer is withdrawn from the tank. Since the air blow and suction means are of the suspension type and no supporting members are present within the fermentation tank, the fermentation product falls under its own weight without bridging for efficient discharge. The fermentation process goes to completion in about 3 days.

Figure 5:
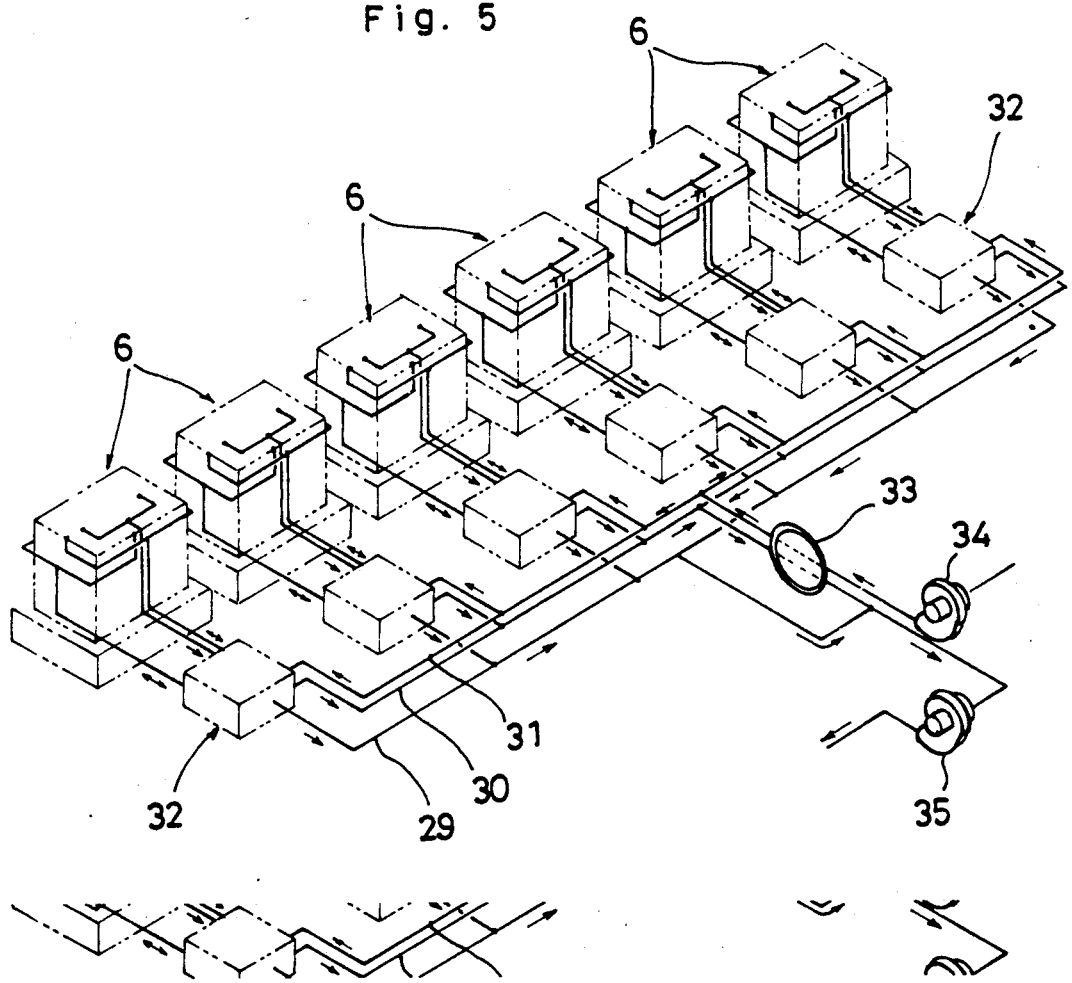
FIG. 5 is a perspective schematic view showing the overall air line system.

FIG. 5 shows an air blow and suction line arrangement for a plant comprising six fermentation tanks of the above construction. Each of these fermentation tanks 6 is provided with an automatic temperature/flow control unit 32. The details of this unit 32 are described hereinafter. There are two exhaust line series 29, 30 and one air supply line series 31, and the exhaust line 30 and supply line 31 are externally lined with an insulating material. The system is equipped with a tubular heat exchanger 33 for utilizing the heat of exhaust air for the heating of supply air and, in addition, with supply and exhaust blowers 34, 35. The warm air exhausted from the exhaust line 30 passes through the heat exchanger 33 and is exhausted. The feed air warmed by this heat of exhaust air flows through the supply line 31 to the control unit 32. Since the exhaust air in an early phase of fermentation is cold, it is not passed through the heat exchanger 33 but exhausted directly from the exhaust line 29.

Figure 6:
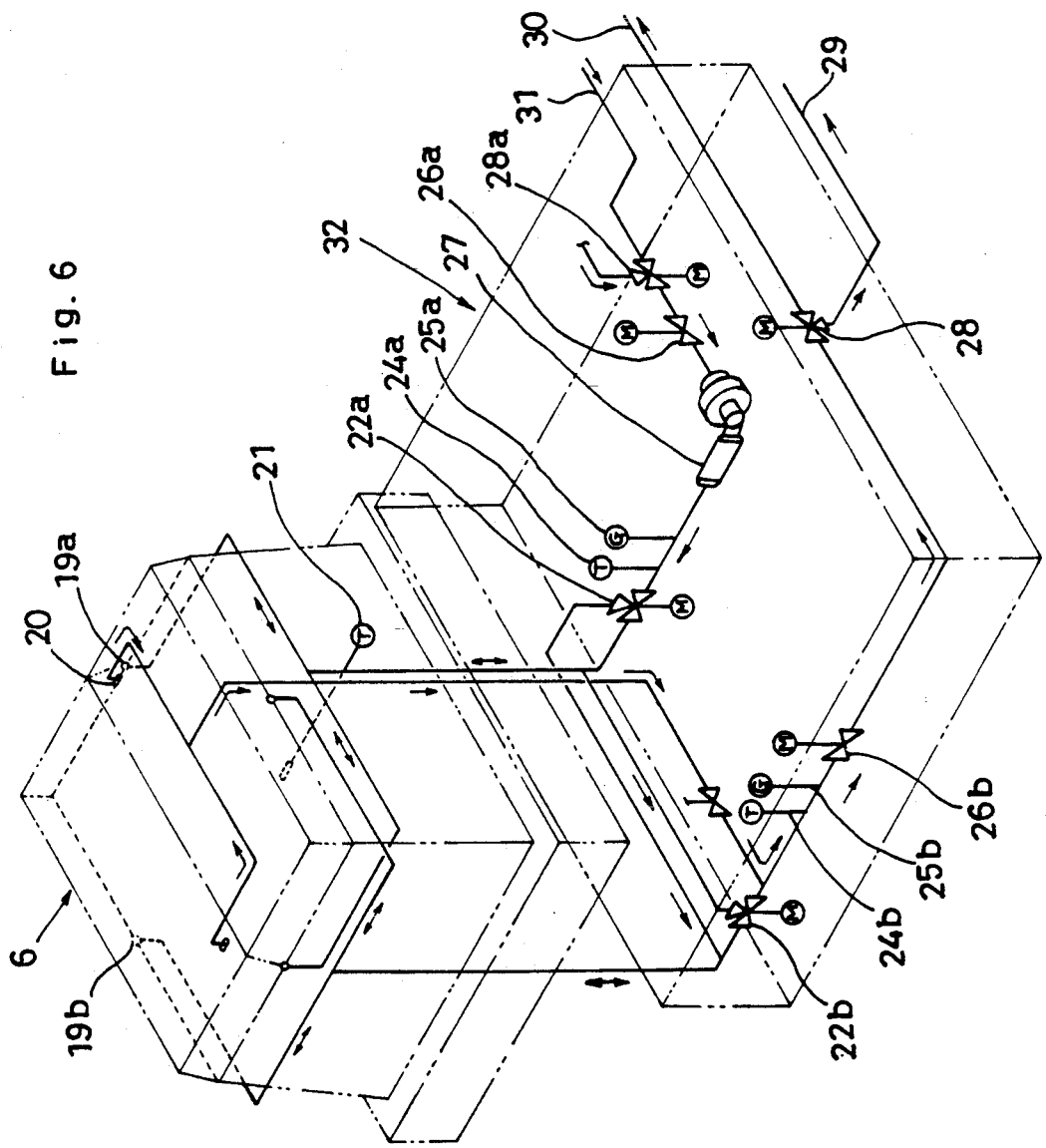
FIG. 6 is a perspective schematic view showing the air line system of a fermentation vessel control unit.

FIG. 6 is a schematic view showing the internal construction of the automatic temperature/flow control unit 32. In the view, the warm air supplied from the supply line 31 flows through a three-way valve 28a to a flow control valve 26a. When the fermentation has progressed far enough and it is no longer necessary to supply warm air, the three-way valve 28a is switched. The air sent by a blower 27 having a warm air generator flows through a flowmeter 25a and its temperature is read and controlled by a temperature controller 24a. The air flow rate is controlled by said flow control valve 26a. In this manner, the air is fed from the supply line 31 to an air supply port 19a, from which it flows through the charge and is exhausted from an exhaust port 19b. The three-way valves 22a, 22b are used for switching the air supply and exhaust lines to the fermentation tank 6 at programmed timings. The air within the top cover of the fermentation tank is exhausted by another route, viz. from the exhaust port 20 through an exhaust control valve 23. The exhausts by the above two routes converge and the pooled air passes through the exhaust air temperature controller 24b, flowmeter 25b and flow control valve 26b. According to the signal from the temperature controller 24b, the three-way valve 28 is switched. Thus, if the temperature rises to a certain level, the air is exhausted by way of exhaust line 30 and if not, the air is exhausted by way of exhaust line 29. This switching is controlled by the exhaust control valve 26b. The temperature controller 24b, flowmeter 25b and tank temperature sensor 21 are provided for generating the information necessary for the above control. In this manner, the air supply-exhaust balance and temperature in each fermentation tank are automatically controlled according to the current status of fermentation, thus enabling a completely automatic conversion of a biodegradable refuse slurry to an odorless fertilizer.

In accordance with the above method and apparatus of the present invention, wherein the air blow means and air suction means are of the suspension type, there is no supporting member within the fermentation vessel, so that the trouble of bridging with the fermentation product fertilizer is eliminated in the stage of discharge. Moreover, as the pipelines for the supply and exhaust of air are installed directly from above, there is no adverse influence on the flow of the fertilizer in the vessel. Therefore, by opening the bottom plate, the fermentation product fertilizer can be efficiently discharged.

Furthermore, because the air blow means comprising said pendant perforated blow tubes or pendant plates and the air suction means comprising said pendant air suction tubes or suction plates are disposed in horizontally spaced-apart and alternate relation, the air blown out from the air blow means flows through the pile of refuse and is then sucked into the air suction means and exhausted. Particularly in the above-described apparatus employing an air blow means comprising pendant perforated air blow tubes or plates and an air suction means comprising pendant perforated air suction tubes or plates, air flows occur in the horizontal direction so that the whole pile of refuse is aerated and the contact of the refuse pile with the air is remarkably increased.

Moreover, by making the supply and exhaust lines switchable from one to the other so that the lines of the blow means and air suction means are reversed periodically, the whole pile of refuse can be uniformly aerated.

As a result, the fermentation efficiency is increased and the fermentation time is shortened. And because the top frame structure of the charging port is utilized as the piping for air supply and the air blow means and air suction means are suspended directly from above, there is no stagnation of air, nor are there air leaks, and the loss of heat is also minimized. Furthermore, when a heat exchanger is interposed in the air feed and exhaust system so as to utilize the heat of exhaust air for the heating of feed air, the amount of heating on the air feed side is decreased, contributing to reduced running cost.

Furthermore, by installing an automatic flow/temperature control unit within the air line system for automatic control of feed air temperature and flow rate and exhaust air flow rate according to the status of fermentation changing with time within the fermentation vessel, savings in manpower and shortening of heating and fermentation times can be realized.

Thus, in accordance with the invention, the discharge work after fermentation is dispensed with, the running cost is decreased, the fermentation efficiency is improved and the fermentation time is reduced, all of which contribute to increased productivity and saving in control work and, hence, in control personnel requirements. Therefore, by means of the present invention, conservation of manpower and energy is accomplished and various organic refuse slurries can be fermented into fertilizers on an all-automatic mode with high efficiency.

What is claimed is:

1. An apparatus for manufacture of an organic fertilizer from an organic biodegradable refuse which comprises at least one fermentor having a top cover which is openable and closable, a heat-insulated body and a bottom cover which is openable and closable, an air blow frame pipe and an air suction frame pipe which are horizontally arranged and form part of a top frame structure of said body, and a plurality of air blow means and air suction means pendant from said part of the top frame structure and communicating with either one of said air blow frame pipe and air suction frame pipe, each of said air blow means and each of said air suction means being disposed in parallel, horizontally spaced apart and alternate relation and wherein said air blow means and air suction means are not supported at their lower portions.

2. An apparatus for manufacture of an organic fertilizer as claimed in claim 1 wherein each of said air blow means comprises a plurality of air blow cross pipes and a perforated blow tube pendant from and communicating with each of said air blow cross pipes and said suction means comprises a plurality of air suction cross pipes and a perforated suction tube pendant from and communicating with each of said air suction cross pipes, said air blow and suction means being alternately arranged.

3. An apparatus for manufacture of an organic fertilizer as claimed in claim 1 wherein said air blow means comprises a plurality of air blow cross pipes and a sealed hollow member consisting of two perforated plates pendant from and communicating with each of said cross pipes and said air suction means comprises a plurality of air suction cross pipes and a sealed hollow member consisting of two perforated plates pendant from and communicating with each of said cross pipes, said air blow and suction means being alternately arranged.

4. An apparatus for manufacturing of an organic fertilizer as claimed in claim 1 wherein said air blow means and air suction means are functionally reversible in such manner that the former may function as air suction means and the latter may function as air blow means and each of said air blow and suction means is provided with respective means for automatically regulating the rate of flow and temperature of the air being blown and suctioned, respectively.

5. An apparatus as claimed in claim 1 wherein the top frame structure is provided with an air supply port and an air exhaust port, said air supply port supplying air from the ambient directly to the top frame structure and said air exhaust port exhausting air directly from the top frame structure to the ambient.

6. An apparatus as claimed in claim 1 wherein a cover is hingedly connected to the bottom of the fermentor and is free to swing open downwardly until it is substantially perpendicular to the bottom of the fermentor.

* * * * *